April 14, 1925.
G. R. FICKERT
1,533,981
BELT LENGTH CALCULATOR
Filed Sept. 29, 1921
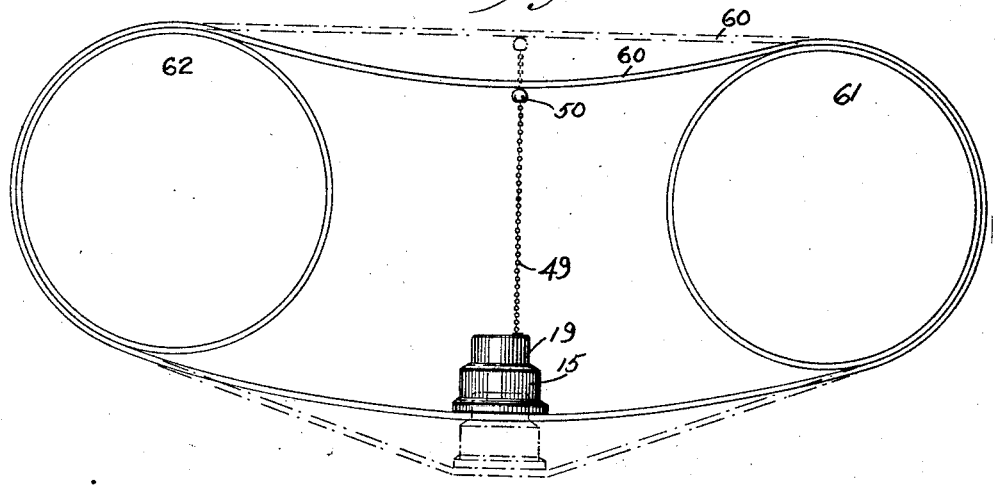
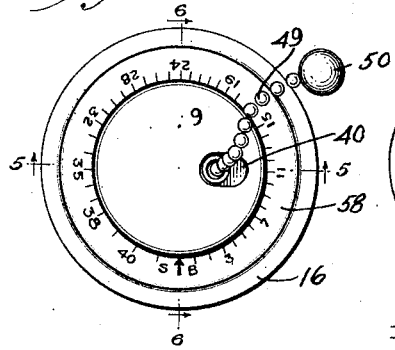
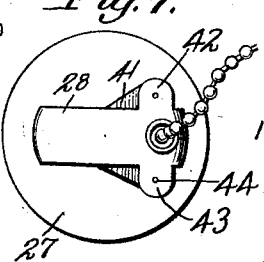
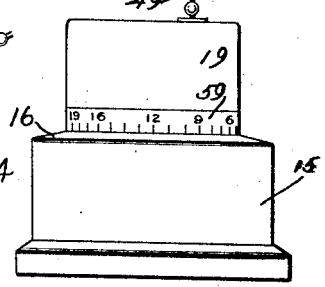
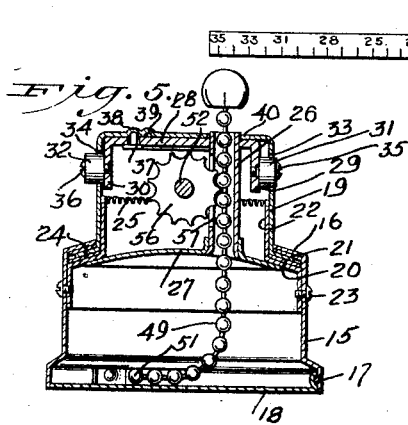
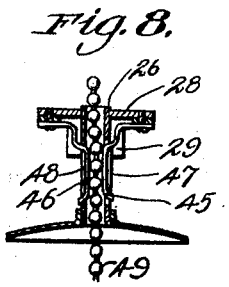
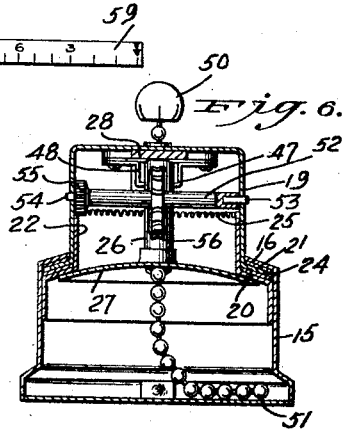
WITNESSES
INVENTOR
GUSTAV R. FICKERT
BY
ATTORNEYS Patented Apr. 14, 1925.

1,533,981

UNITED STATES PATENT OFFICE.

GUSTAV RICHARD FICKERT, OF HOBOKEN, NEW JERSEY.

BELT-LENGTH CALCULATOR.

Application filed September 29, 1921. Serial No. 504,017.

*To all whom it may concern:*

Be it known that I, GUSTAV R. FICKERT, a citizen of the United States, and a resident of Hoboken, in the county of Hudson and State of New Jersey, have invented a new and Improved Belt-Length Calculator, of which the following is a full, clear, and exact description.

This invention relates to a belt-length calculator.

Prior to this invention the usual practice in fitting belts was to measure the length around the pulleys and then, by reference to a set of tables or by use of certain factors, estimate the length of the belt required to give a satisfactory driving tension. Such a method was slow and it was necessary for the operator to have a certain training in mathematics.

The object of this invention is the provision of a simple and efficient device that may be easily operated by any one to discover the length of belt required to give the desired tension of a belt.

The object of this invention is accomplished by providing an extensible measuring means and scales operated by the extension of the measuring means to indicate the length of belt to be cut away to give the required tension.

This and other objects of the invention will be more clearly understood from the following detailed description and accompanying drawings.

Figure 1 shows the belt calculator placed in position to measure the distance between the runs of a belt;

Figure 2 is a top plan view of the belt calculator;

Figure 3 is a side elevation of the belt calculator;

Figure 4 is a diagram of the scale placed around the upper drum of the belt calculator;

Figure 5 is a cross section along the line 5—5, Figure 2;

Figure 6 is a cross section along the line 6—6, Figure 2;

Figure 7 is a top plan view of the chain guide;

Figure 8 is a cross section through the chain guide showing the springs for holding the chain centrally spaced in the tube.

Referring to the above-mentioned drawings, a base drum 15 is provided with an annular collar 16 and a plurality of projections 17 which serve to hold the bottom 18 in position. The upper drum 19 having a collar 20 extending outward around the base is mounted in the drum 15, the wall of the drum 19 bearing against the annular collar 16 of the drum 15. A friction washer 21 is fitted between the collars 16 and 20. An annular member 22 is mounted inside the drum 15 and held in position by means of screws 23. The upper portion of this annular member 22 is of smaller diameter than the lower portion and extends upward into the drum 19. The upper edge of this annular member 22 is provided with a plurality of teeth 25. In this case the number of teeth is 60 but this number will depend on the other parts of the device. A friction washer 24 is located between the collar 20 of the drum 19 and the shoulder of the annular member 22. The friction washers 21 and 24 serve to give a tight fit and also to retain the drums in any relative position to which they may be rotated. These washers 21 and 24 are waved in order to give a snug fit to overcome slight errors in the drilling of holes or in the thickness of the material in the casing. A guiding means for a measuring member is mounted in the upper drum 19. This guiding means consists of a tube 26, to the lower portion of which is connected a curved plate 27 that is larger in diameter than the diameter of the upper portion of the annular member 22 and which slidably seats on the shoulder of this annular member. Fixed to the upper end of the tube 26 is a plate having two depending end members 29 and 30. This plate 28 is shorter in length than the inside diameter of the drum 19. Two cylindrical bearing members 31 and 32 project through openings 33 and 34, respectively, in the drum 19. The cylindrical bearing members are attached to the depending end members 29 and 30 of the plate 28 by means of screws 35 and 36. The plate 28 bears against the top of the drum 19 and has a stud 37 projecting therethrough which may engage in either of the holes 38 or 39 provided in the top of the drum. The tube 26 extends above the plate 28 and through an opening 40 in the top of the drum 19. This opening 40 is long enough to allow a certain movement of the plate 28. This plate 28 may be moved lengthwise by pressing on either of the cylindrical bearing members 31 or 32. The distance to which the plate may be moved depends on the difference in the length of the internal diameter of the drum 19 and the plate 28.

The stud 37 that projects through the plate 28 is mounted on a spring member 41 (Figure 7) attached to lugs 42 and 43 integral with the plate 28 by means of screws 44. Integral with the spring 41 are two depending spring members 45 and 46 (Figure 8) which fit through slots 47 and 48 in the tube 26 and serve to hold the chain 49 centrally spaced in the tube and keep it under tension when out of contact with the gear 56. This chain 49 which serves as the measuring means is contained in the lower drum 15. It is provided with a ball 50 on the outer end and a ball 51 on the inner end, both of larger diameter than the internal diameter of the tube 26 so that they may not be drawn through the tube.

A shaft 52 (Figure 6) is rotatably mounted on pins 53 and 54 extending through the walls of the drum 19. A gear 55 is mounted on one end of the shaft 52 and meshes with the teeth 25 of the annular member 22. Another gear 56 is mounted at the center of the shaft 52 and the teeth are so shaped that they engage the chain 49. A slot 57 is provided in the tube 26 and is of such a size that the gear 56 projects through it when the tube 26 is moved toward the gear by pressing the cylindrical bearing member 31 (Figure 5). When the gear 56 projects through the slot 57 it engages the chain and if the chain is drawn through the tube the gear 56 is rotated.

As shown in Figure 2, a scale 58 is mounted on the collar 16 of the drum 15, and a scale 59 is located on the lower edge of the drum 19. The graduation of these scales is accomplished by a series of experiments.

In carrying out experiments to graduate these scales two pulleys each 12 inches in diameter are placed about 15 to 20 feet apart and a belt mounted thereon. If in order to obtain the proper working tension of the belt it is necessary to spread the belt runs one inch then three-sixteenths of an inch of lineal length of belt must be cut away in the case of double belting. Double belts or 2-ply run from 5/16" to 7/16" in thickness; single-ply belts range from 3/16" to 1/4". A base line is marked on the scales 58 and 59. The chain 49 is then thrown into active engagement with the gears to rotate the drum 19 relative to the drum 15 and is withdrawn one inch from the drums, rotating the drum 19 through an angle. A mark is made on the scale 59 in alinement with the base line on the scale 58. The distance between the base line on the scale 59 and the mark in alinement with the base line on the scale 58 is then divided into three equal parts and each represents a sixteenth of an inch. The chain is drawn out inch by inch and the arc through which the drum rotates upon the drawing out of each inch of chain is graduated as described above. There are three exceptions in the forming of the scale. It has been found by experiment that when the belt runs have to be spread 5 inches in order to give the proper working tension it is necessary to cut away one inch. Therefore, the arc through which the drum is rotated by the drawing out of the fifth inch of chain is divided in four equal parts. The arcs through which the drum is rotated by drawing out the eleventh and twelfth inches of the chain are divided into two equal parts each representing sixteenths of an inch of belt to be cut away.

In graduating the scale 58 for single belting, which normally includes belting three-sixteenths to five-sixteenths inch in thickness, the drums are returned to their normal positions with the base lines on the scales 58 and 59 in alinement. By mounting the belt on the pulleys described in the preceding paragraph it is found that when the belt runs have to be separated one inch in order to give the proper working tension that three-sixteenths of lineal length of belt must be cut away. If the belt runs have to be separated 2 inches in order to give the proper working tension then seven-sixteenths inch of belt must be cut away. The chain 49 is thrown into engagement with the gears which operate the drum 19 and is then drawn out inch by inch. The arcs through which the drum 19 rotates as measured on the scale 58 are divided into the following number of equal parts: for the first inch of movement of the chain, 3; for the second, 4; and so on, depending on the amount of belt that should be cut away in order to give the proper working tension.

After the scales have been graduated in the manner described above they may be used for determining the lineal length of any belt that should be cut away in order to give the proper working tension. For practical purposes the differences in the distances between the pulleys may be neglected.

The operation of the device is as follows:

Consider a belt 60 extending around pulleys 61 and 62. If the belt 60 is too slack and allowing too much slip and it is desired to determine the length of belt necessary to give the proper belt tension, the belt calculator may be used. The cylindrical bearing member 32 (Figure 5) is pressed inward, forcing the tube 26 and the chain 49 away from the gear 56. Then the calculator is placed on the lower run of the belt 60 and the chain 49 drawn upward until the ball 50 touches the upper run. The cylindrical bearing member 31 is then pressed inward carrying the chain into engagement with the gear 56. Pressure is then exerted on the belt, forcing the upper and lower runs to the position shown by the dotted lines in Figure 1, when they are under the required tension. The chain 49 which serves as the measuring means is then drawn outward rotating the gear 56. This rotates the shaft 52 and gear 55 and causes the upper drum 19 to revolve and the arrow on the scale mounted on the upper drum moves away from the arrow marked on the scale on the lower drum. When the ball 50 of the chain 49 reaches the upper run the reading on the scale is taken. If it is single belting, scale 58 is used and for double belting scale 59. The reading on either scale gives the number of sixteenths of an inch by which the length of the belt should be reduced to give the proper tension.

This device may also be used with cross belts, in which case it is inserted between the two runs at the point where they cross. Before the calculator is inserted between the belts the chain should be moved out of engagement with the gear 56 and the scale 59 rotated until it indicates seven-sixteenths of an inch. The scale used will depend upon whether it is single or double belting that the operator is working with. If the calculator can be inserted between the runs of the belt it will indicate that the length of the belt will have to be reduced by seven-sixteenths of an inch. Should it be possible to further spread the runs of the belt the chain 49 should be moved into engagement with the gear 56 and pressure applied to spread the runs of the belt until the proper tension is obtained. The chain 49 is drawn out to measure the distance between the belt runs and in doing so the upper drum is revolved and the reading on the scale will give the number of sixteenths of an inch by which the belt should be shortened.

Claims.

1. A belt length calculator, comprising a measuring member, a sectional casing constructed so that one section may be rotated relative to the other, said casing serving to carry the measuring member, cooperating scales carried by the sections of the casing, means for rotating one section of the casing relative to the other, and means for throwing the measuring member into engagement with said means for rotating one section of the casing relative to the other, to operate the sections by the withdrawal of the measuring member.

2. A belt length calculator comprising a flexible measuring member, a sectional casing carrying belt stretch scales mounted so that one section may be rotated relative to the other enclosing said measuring member, and means operated by the withdrawal of the measuring member for rotating one section of the casing relative to the other to indicate excess belt length corresponding to the movement of the measuring member.

3. A device of the class described, comprising a measuring member, a sectional casing including two cylindrical-shaped members mounted for rotation relative to one another about a vertical axis carrying the measuring member, scales located on the casing members for indicating excess belt length, and means operated upon the movement of the measuring member to rotate one casing member relative to the other.

4. A belt length calculator, comprising a flexible measuring member, a sectional casing having scales marked on each section enclosing the measuring member, said sections being mounted for rotation relative to one another, means carried by the casing for engaging the measuring member to rotate one section of the casing relative to the other upon the movement of the measuring member, and means for shifting the measuring member engaging means out of engagement with the measuring member so that the latter may be moved freely.

5. A device of the class described comprising a casing including two drum-shaped members so mounted that they may be rotated relative to one another about a vertical axis, scales carried by said drum-shaped members, a measuring member enclosed within said casing, a gear adapted to engage said measuring member mounted for movement into and out of engagement with said measuring member, and means operated by the gear for rotating one section of the casing relative to the other when said gear is operated by the movement of the measuring member, the movement of said casing section serving to indicate by the scales excess belt length corresponding to the movement of the measuring member.

6. A belt length calculator of the class described, comprising drums rotatable relative to one another, a flexible measuring member in conjunction with the drums, means in conjunction with one drum to engage the measuring member to revolve the former as the latter is drawn up, and scales mounted on the drums to indicate the angle through which one drum rotates relative to the other for a certain movement of the measuring member.

7. A belt length calculator of the class described, comprising a casing formed from drums rotatably mounted relative to one another, means for rotating one drum relative to the other mounted in the casing, a flexible measuring means enclosed in said casing, means for moving said drum rotating means into engagement with the flexible measuring means so that the former will be operated on the withdrawal of the measuring means, and scales carried by the drums for indicating excess belt length corresponding to a certain movement of the measuring means.

8. A belt length calculator of the class described including a sectional casing having the sections mounted for rotation relative to one another and a measuring member enclosed within said casing, means operated by the withdrawal of the measuring member for rotating one section of the casing relative to the other, and scales carried by the casing sections for indicating excess belt length corresponding to a certain movement of the measuring member.

9. A belt length calculator of the class described, comprising a casing consisting of two drum-shaped members mounted for rotation relative to one another about a vertical axis, a measuring member enclosed within said casing, an annular member attached to one of said members and having teeth formed in its upper edge, a shaft rotatably mounted in the other drum member and having two gears mounted thereon, one for engaging said annular toothed member and the other for engaging said measuring member, means for moving the measuring member into and out of engagement with the gear, and scales carried by the drum members for indicating the angle through which said drums are rotated relative to one another by the withdrawal of the measuring member.

GUSTAV RICHARD FICKERT.